United States Patent Office 2,835,102
Patented May 20, 1958

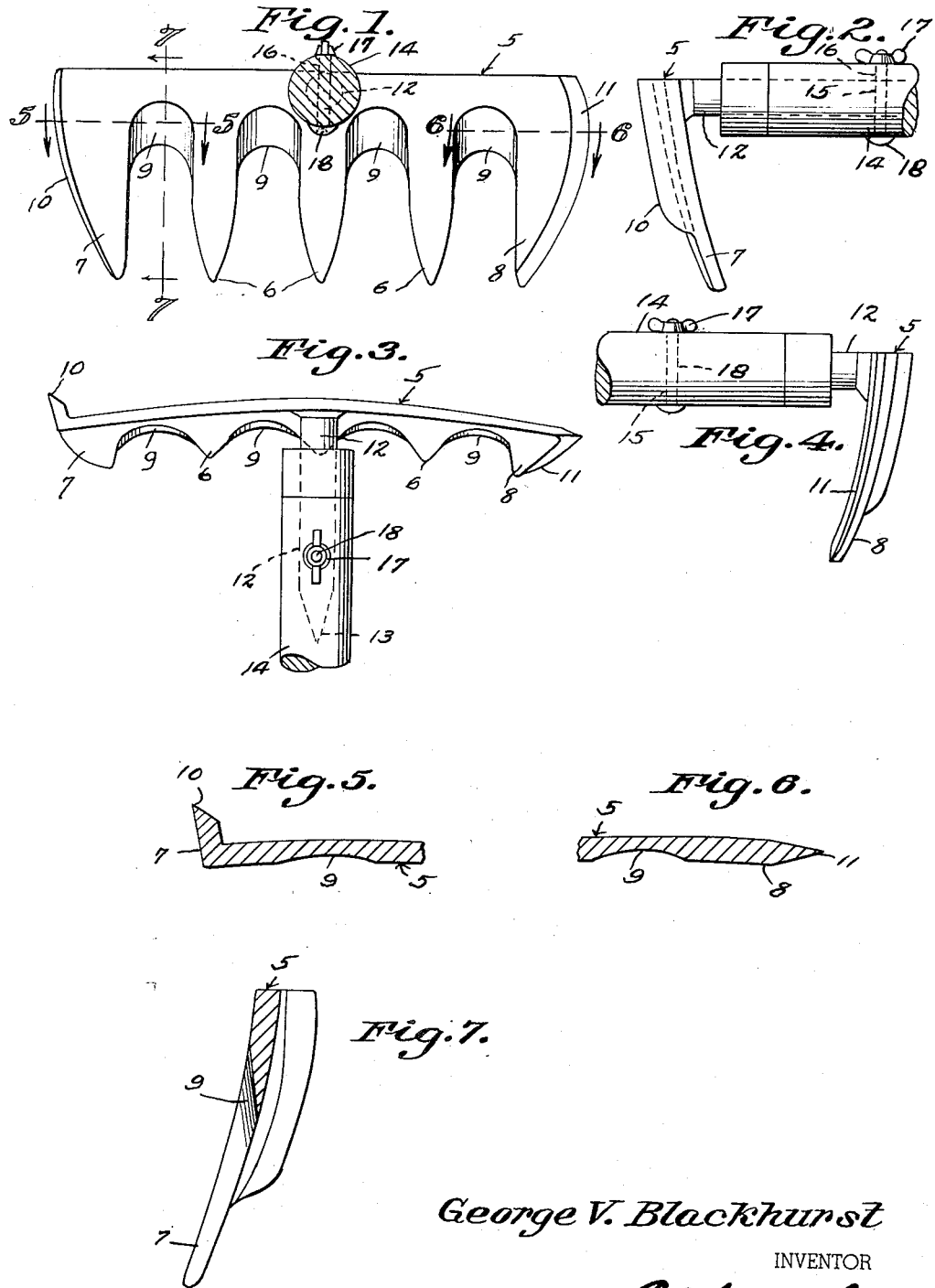
George V. Blackhurst
INVENTOR

2,835,102

RAKE WITH CUTTER BLADE

George V. Blackhurst, Cochranton, Pa.

Application October 26, 1954, Serial No. 464,809

1 Claim. (Cl. 56—400.07)

This invention relates to graden implements, and more particularly to a combined rake, hoe and weed cutter.

An important object of the invention is to provide an implement of this character which has cutting blades disposed between the teeth thereof, so that as the rake is being moved through the soil during raking the blades will cut weeds or other vegetation, removing the same.

Another object of the invention is to provide a forwardly projecting cutting blade formed on one of the end teeth of the implement which may be used in pushing and cutting weeds or vegetation away from growing plants, without damage to such plants.

Another object of the invention is to provide means for effectively securing garden tool heads to their handles, thereby insuring against accidental displacement of the tool head, and at the same time provide means for using various garden tool heads with a single handle.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a rear elevational view of the implement head, constructed in accordance with the invention.

Fig. 2 is an end elevational view thereof.

Fig. 3 is a plan view of the implement head.

Fig. 4 is an end elevational view of the implement head, opposite to the end shown by Fig. 2.

Fig. 5 is a sectional view taken on line 5—5 of Fig. 1.

Fig. 6 is a sectional view taken on line 6—6 of Fig. 1.

Fig. 7 is a sectional view taken on line 7—7 of Fig. 1.

Referring to the drawing in detail, the implement head is indicated generally by the reference character 5, the head being shown as slightly curved, for purposes to be hereinafter more fully described. The reference character 6 indicates the intermediate teeth of the implement head, while the reference characters 7 and 8 indicate the end teeth of the implement.

As better shown by Fig. 1 of the drawing, the teeth 6 are spaced wide distances apart, and the portions of the teeth where the teeth merge into the head of the implement, are beveled, as at 9, providing cutting blades between the teeth to be used in cutting weeds or other vegetation with the implement when hoeing or raking in the preparation of a garden or weeding park ways or the like.

Extending forwardly from the tooth 7, and extending throughout the major length of the tooth 7, is a flange forming a blade 10 which may be used in pushing against weeds or other vegetation to cut the same, the blade being especially designed for use in cutting close to plants in order to remove weeds.

The other end tooth 8 of the implement has its outer edge beveled providing a cutting blade 11 to be used when the implement is converted or used in chopping or cutting an edge of a grass plot or park way.

The reference character 12 indicates the shank of a garden implement head, having a pointed end 13 adapted to be positioned in a bore in one end of a handle 14 whereby the implement may be used as either a hoe, rake or cutter.

As shown, the shank 12 is provided with an opening 15 that registers with the opening 16 extended transversely through the handle 14 in which registering openings a bolt 18 is positioned securing the implement head firmly to the handle, and at the same time providing an implement wherein the head thereof may be readily changed to meet various requirements of use.

A wing nut 17 is then threaded on the threaded end of said bolt, removably securing the implement head to said handle 14.

It will further be seen that because of the blades 9, the implement head, when it is being used as a rake, and the teeth forced into the ground surface, the blades 9 will cut weeds or other vegetation at the ground surface, whereupon the device may be elevated slightly and the teeth used in raking the cut vegetation or weeds, from the surface.

Having thus described the invention, what is claimed is:

A garden implement comprising a head, wide pointed end and intermediate teeth extending from said head, a flange formed along the edge of one of said end teeth and disposed at right angles to the teeth, the forward edge of said flange being inwardly curved toward the pointed end of said tooth, the forward edge of said flange being beveled providing a forwardly extended cutting edge terminating adjacent to the point of said tooth, and a handle connected with said head.

References Cited in the file of this patent

UNITED STATES PATENTS

| | | |
|---|---|---|
| 84,231 | Thacker | Nov. 17, 1868 |
| 197,956 | Walker | Dec. 11, 1877 |
| 789,021 | Hartman | May 2, 1905 |
| 850,228 | Jackson | Apr. 16, 1907 |
| 1,189,987 | Money | July 4, 1916 |
| 2,395,111 | Friedheim | Feb. 19, 1946 |
| 2,527,256 | Jackson | Oct. 24, 1950 |

FOREIGN PATENTS

| | | |
|---|---|---|
| 15,005 | Great Britain | 1885 |